(12) United States Patent
Lee et al.

(10) Patent No.: US 11,435,985 B2
(45) Date of Patent: Sep. 6, 2022

(54) ELECTRONIC DEVICE AND OPERATION METHOD THEREOF

(71) Applicant: Samsung Electronics Co., Ltd., Suwon-si (KR)

(72) Inventors: Kyungseok Lee, Suwon-si (KR); Hyunjoon Kim, Suwon-si (KR); Jeongsik Mun, Suwon-si (KR); Chui Kang, Suwon-si (KR); Hakryoul Kim, Suwon-si (KR); Hyojong Kim, Suwon-si (KR); Mooyoung Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/975,056

(22) PCT Filed: Feb. 19, 2019

(86) PCT No.: PCT/KR2019/001945
§ 371 (c)(1),
(2) Date: Aug. 21, 2020

(87) PCT Pub. No.: WO2019/164205
PCT Pub. Date: Aug. 29, 2019

(65) Prior Publication Data
US 2020/0401384 A1 Dec. 24, 2020

(30) Foreign Application Priority Data
Feb. 23, 2018 (KR) .................. 10-2018-0021898

(51) Int. Cl.
*G06F 8/41* (2018.01)
*G06F 9/4401* (2018.01)
(Continued)

(52) U.S. Cl.
CPC .............. *G06F 8/41* (2013.01); *G06F 9/4401* (2013.01); *G06F 9/5061* (2013.01); *G06F 11/14* (2013.01); *G06F 2209/501* (2013.01)

(58) Field of Classification Search
CPC .... G06F 8/41; G06F 11/14; G06F 2209/5011; G06F 9/4401; G06F 9/5061
See application file for complete search history.

(56) References Cited

U.S. PATENT DOCUMENTS 6,138,234 A 10/2000 Lee et al.
10,599,404 B1* 3/2020 Neto .................. G06F 8/40
(Continued)

FOREIGN PATENT DOCUMENTS

JP 2006-268070 A 10/2006
JP 2007-048052 A 2/2007
(Continued)

OTHER PUBLICATIONS

Tohma Kawasumi et al., Fast and Highly Optimizing Separate Compilation for Automatic Parallelization, IEEE, 2019, retrieved online on Apr. 18, 2022. (Year: 2019).*
(Continued)

*Primary Examiner* — Hanh Thi-Minh Bui

(57) ABSTRACT

The electronic device may comprise: a display; a processor electrically connected to the display and including a plurality of cores; and a memory electrically connected to the processor, wherein the memory is configured to store a plurality of application programs, and stores instructions which, when executed, allow the processor to perform parallel compilation of two or more application programs among the plurality of application programs by using two or more cores among the plurality of cores during a booting operation, and when at least one application program which has failed to be compiled is sensed, perform a rebooting operation, and perform series compilation of the at least one
(Continued)

application program which has failed to be compiled, by using one core among the plurality of cores during the rebooting operation. Other embodiments may also be possible.

14 Claims, 10 Drawing Sheets

(51) Int. Cl.
*G06F 11/14* (2006.01)
*G06F 9/50* (2006.01)

(56) References Cited

U.S. PATENT DOCUMENTS

| | | |
|---|---|---|
| 2007/0038987 A1 | 2/2007 | Ohara et al. |
| 2010/0153937 A1 | 6/2010 | Richards et al. |
| 2016/0004570 A1 | 1/2016 | Koh et al. |
| 2016/0085719 A1* | 3/2016 | Park ............ G06F 9/5077 712/32 |
| 2016/0378458 A1 | 12/2016 | Pan et al. |
| 2017/0220335 A1 | 8/2017 | Pink et al. |

FOREIGN PATENT DOCUMENTS

| | | |
|---|---|---|
| JP | 2007-193423 A | 8/2007 |
| JP | 2016-218503 A | 12/2016 |
| KR | 10-0250464 B1 | 4/2000 |
| KR | 10-2008-0093108 A | 10/2008 |
| KR | 10-2019-0021726 A | 3/2019 |

OTHER PUBLICATIONS

International Search Report and Written Opinion of the International Searching Authority in connection with International Application No. PCT/KR2019/001945 dated May 28, 2019, 11 pages.
Korean Intellectual Property Office, "Notice of Preliminary Rejection," dated May 30, 2022, in connection with Korean Patent Application No. 10-2018-0021898, 15 pages.

* cited by examiner

ELECTRONIC DEVICE AND OPERATION METHOD THEREOF

CROSS-REFERENCE TO RELATED APPLICATIONS

This application is a 371 National Stage of International Application No. PCT/KR2019/001945, filed Feb. 19, 2019, which claims priority to Korean Patent Application No. 10-2018-0021898, filed Feb. 23, 2018, the disclosures of which are herein incorporated by reference in their entirety.

BACKGROUND

1. Field

Various embodiments of the present disclosure relate to an electronic device for compiling an application program and an operation method thereof.

2. Description of Related Art

With the growth of information telecommunication technologies and semiconductor technologies, electronic devices providing various services are being provided. For example, various electronic devices such as mobile communication terminals, Personal Digital Assistants (PDAs), electronic organizers, smart phones, tablet Personal Computers (PCs), wearable devices, etc. are being used.

As the use of the electronic devices is suddenly increased, demand for performance improvement of the electronic devices through various schemes is being made. For the sake of the performance improvement, the electronic device can perform ahead-of-time (AOT) compilation optimizing an application program during a booting operation. The AOT compilation can refer to a scheme of previously translating an application program distributed in an intermediate language form irrespective of a machine language of a target system, into a machine language suitable to the target system, through machine language translation such as interpreter or just-in-time complication (JIT) compilation, etc., in the target system.

SUMMARY

The electronic device sequentially performs AOT compilation of each of a plurality of application programs installed in the electronic device, during a booting operation. For example, the electronic device selects one application program among the plurality of application programs and performs AOT compilation of the selected application program and, if the AOT compilation of the selected application program is completed, the electronic device selects another application program and performs AOT compilation of the selected another application program. Accordingly, a very long time may be required to perform the AOT compilation of all the application programs installed in the electronic device.

Accordingly, various embodiments of the present disclosure disclose a method and apparatus for performing parallel compilation of a plurality of application programs during a booting operation in an electronic device.

According to various embodiments, an electronic device may include a display, a processor electrically connected to the display and including a plurality of cores, and a memory electrically connected to the processor. The memory may be configured to store a plurality of application programs, and may store instructions which, at execution, allow the processor to perform parallel compilation of two or more application programs among the plurality of application programs by using two or more cores among the plurality of cores during a booting operation, and in response to at least one application program which has failed to be compiled being sensed, perform a rebooting operation, and perform series compilation of the at least one application program which has failed to be compiled, by using one core among the plurality of cores during the rebooting operation.

According to various embodiments, an operation method of an electronic device may include performing parallel compilation of two or more application programs by using two or more cores among a plurality of cores included in the electronic device during a booting operation, and in response to at least one application program which has failed to be compiled being sensed, performing a rebooting operation, and performing series compilation of the at least one application program which has failed to be compiled, by using one core among the plurality of cores during the rebooting operation.

According to various embodiments, an electronic device may include a display, a processor electrically connected to the display and including a plurality of cores, and the memory electrically connected to the processor. The memory may be configured to store a plurality of application programs, and may store instructions which, at execution, allow the processor to provide system attribute information on the basis of a system information file, during a booting operation, and provide a plurality of compilation processes on the basis of the provided system attribute information, and perform parallel compilation of two or more application programs among the plurality of application programs by using the provided plurality of compilation processes.

By performing parallel compilation of a plurality of application programs during a booting operation, an electronic device of various embodiments of the present disclosure and an operation method thereof may efficiently use a resource, and shorten a time required for booting.

By, in response to an application program which has failed to be parallel compiled during a booting operation being sensed, performing a rebooting operation and performing series (or sequential) compilation of the application program which has failed to be parallel compiled, an electronic device of various embodiments of the present disclosure and an operation method thereof may safely perform compilation of an application needed to be compiled.

DETAILED DESCRIPTION

Figure 1:
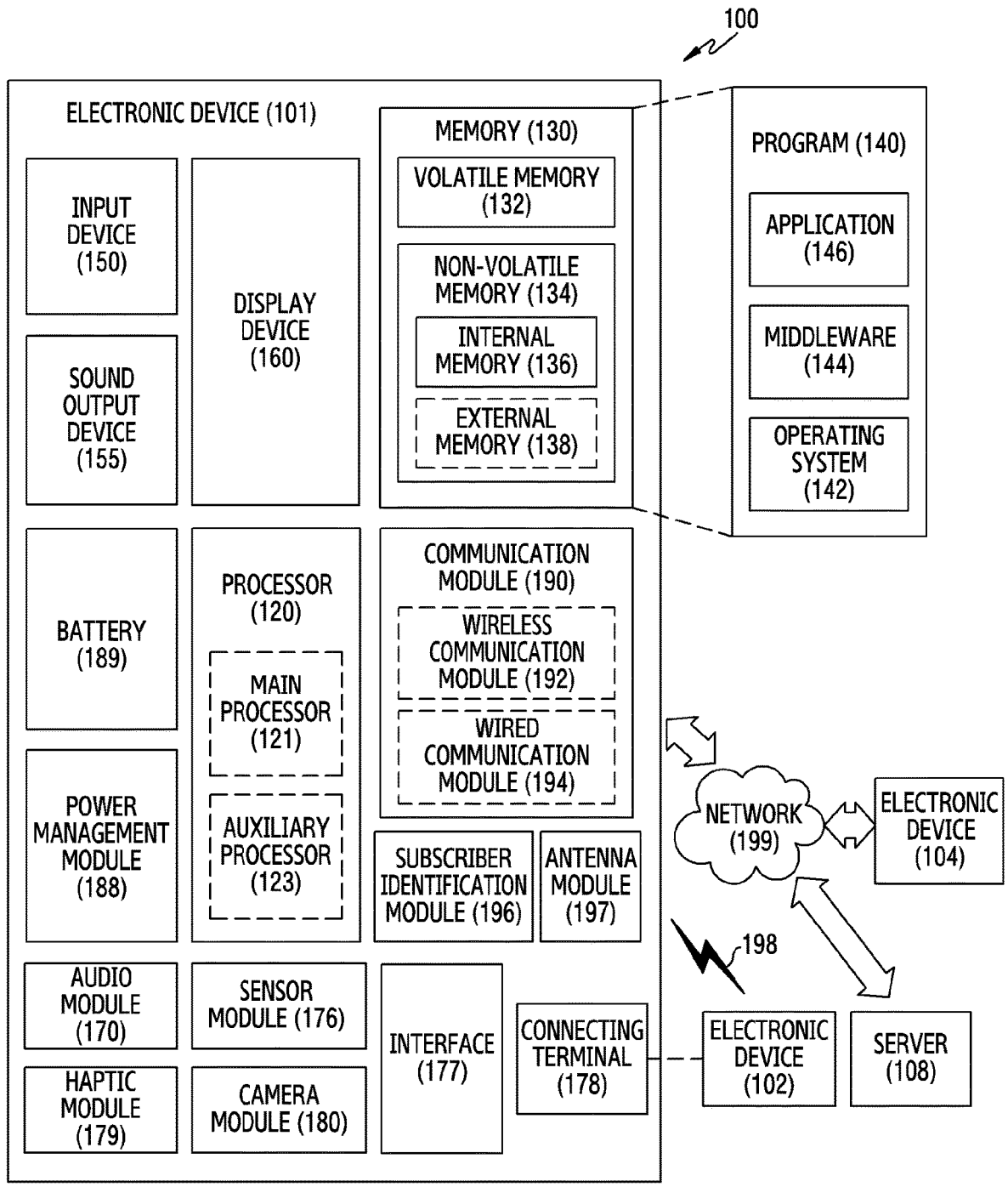
FIG. 1 is a block diagram of an electronic device within a network environment according to various embodiments.

Various embodiments of the present document are mentioned below with reference to the accompanying drawings. It should be appreciated that an embodiment and the terms used therein do not intend to limit the technology set forth therein to a particular embodiment form, and include various modifications, equivalents, and/or alternatives of a corresponding embodiment. In relation to a description of the drawing, like reference symbols may be used for like components. The expression of a singular form may include the expression of a plural form unless otherwise dictating clearly in context.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
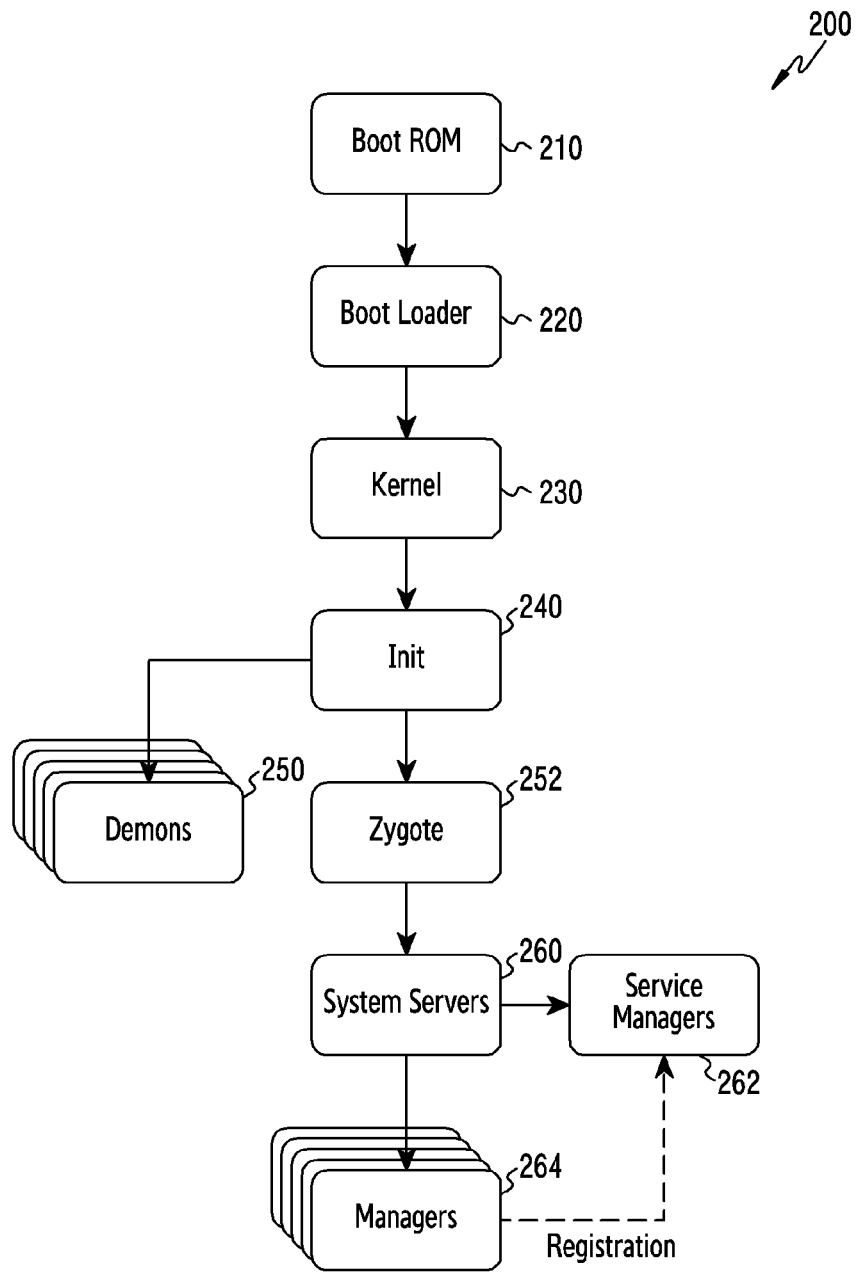
FIG. 2 is a block diagram illustrating a booting operation of an electronic device of various embodiments.

A booting operation of an electronic device is described below with reference to FIG. 2. FIG. 2 is a block diagram 200 illustrating the booting operation of the electronic device of various embodiments. According to an embodiment, the electronic device may be an electronic device (e.g., the electronic device 101 of FIG. 1) employing an Android operating system.

Referring to FIG. 2, a processor (e.g., the processor 120 of FIG. 1) of various embodiments may sense a booting event on the basis of user input or specified event occurrence, and perform a booting operation of an operating system. For example, the processor 120 may perform the booting operation of the operating system, on the basis of a user input for a power on/off button, a user input for factory reset, or a wired/wireless firmware upgrade event (e.g., a firmware over the air (fota) event).

According to various embodiments, the processor 120 may, at booting event sensing, execute a boot loader 220 stored in a boot ROM 210, and perform kernel 230 initialization through the executed boot loader 220, and call an init 240 process. By using the init 240 process, the processor 120 may initialize at least one component included in the electronic device, and execute at least one of demons 250 (e.g., a USB demon, an Android debug bridge demon, a debugger demon, or a wireless interface layer demon) necessary for a framework operation, or a zygote 252. The zygote 252 is a process previously forked in order to shorten a loading time of an application program, and java-based Android application programs may operate on the process forked through the zygote 252. The processor 120 supporting an operating system of an Android runtime (ART) environment may execute various kinds of java components within an application framework through the zygote 252. By using the zygote 252, the processor 120 may execute system servers 260. The system servers 260 may be an Android application process which is initially forked and executed in the zygote 252. The processor 120 may register various manager services 264 to service managers 262 through the system servers 260. For example, the system servers 260 may register, to the service managers 262, a java system service such as an activity manager service which manages a lifetime cycle of an application program, a location manager service which manages a location of the electronic device, or a package manager service which manages information of application programs being operating in a system.

According to various embodiments, the processor 120 may perform compilation for optimizing application programs installed in the electronic device, during an operation of registering a package manager service to the service manager 262 through the system servers 260. For example, the processor 120 may perform compilation for allowing the application programs installed in the electronic device to be executed in an ART environment, during the operation of registering the package manager service. For instance, by performing compilation of converting a code of an application program into a code executable in the ART environment at a time point of installation of the application program, the processor 120 supporting the operating system of the ART environment may allow the application program to be immediately executed without a separate compilation operation at a future execution time point of the application program. According to an embodiment, by using the system servers 260 and an install demon (installd) process, the processor 120 may perform compilation (e.g., ahead-of-time (AOT) compilation) of each of a plurality of application programs installed in the electronic device. For example, by requesting AOT compilation of an application program to the install demon process by using the system servers 260 and performing the AOT compilation of the application program by using the install demon process, the processor 120 may convert an application program of a dalvik executable (dex) format into a file of an optimized ahead-of-time (oat) format. The application program of the dex format may include a byte code executable in the ART environment. In various embodiments below, a compilation operation of converting the application program of the dex format into the oat format may be denoted as dexopt, and a compilation process of converting the application program of the dex format into the oat format may be denoted as a dex2oat process.

According to various embodiments, the processor 120 may perform parallel compilation of two or more application programs during a booting operation of the electronic device. According to an embodiment, the processor 120 may provide a first application list including information about application programs which will be AOT compiled by using the system server 260. For example, the first application list may include information about at least one of a core application program, a system application program, an application program used by other application programs, or an application program having a history having been used within a previously set period of time (e.g., within 7 days from a booting operation start time point) in the electronic device. The core application program may include an application program embedded by a manufacturing company. For example, the core application program may include an application program which is installed by the manufacturing company and thus is impossible to be deleted and stopped. According to an embodiment, the first application list may include information about at least one of an application program not having an AOT compilation completion history, or an application program having an AOT compilation completion history but being updated after AOT compilation completion. For example, when providing the first application list by using the system server 260, the processor 120 may exclude at least one application program which has not been updated after AOT compilation has been successfully performed, among the application programs installed in the electronic device. According to an embodiment, by using the system server 260, the processor 120 may provide the first application list, on the basis of a compilation completion list (or a compilation success list), or at least one of apk files related to the respective application programs installed in the electronic device. The compilation completion list may include information of at least one application program which has been successfully completed to be parallel compiled or series compiled during a previous booting operation. The information of the application program included in the compilation completion list may include at least one of an ID of the application program, a name of the application program, or version information of the application program. For example, the processor 120 may acquire an installation application list representing the application programs installed in the electronic device, on the basis of the apk files installed in the electronic device. The installation application list may include information of at least one application program installed in the electronic device. The information of the application program included in the installation application list may include at least one of an ID of the application program, a name of the application program, or version information of the application program. The processor 120 may compare the compilation completion list and the installation application list, and select an application program which is included in the installation application list but is not included in the compilation completion list, and/or an application program which is included in the compilation completion list and the installation application list but has different version information, and provide the first application list including the selected application programs. The application program which is included in the compilation completion list and the installation application list but has the different version information may be an application program which has been updated after AOT compilation has been successfully performed. According to an embodiment, in response to initially performing a booting operation in the electronic device, the compilation completion list does not exist, so the processor 120 may provide the first application list on the basis of the installation application list. For example, the processor 120 may select all the application programs included in the installation application list, and provide the first application list including the selected all application programs.

According to various embodiments, the processor 120 may provide a plurality of compilation processes (e.g., dex2oat processes) for performing parallel compilation of a plurality of application processes included in the first application list, on the basis of a system information file during a booting operation. According to an embodiment, the processor 120 may provide (or acquire) system attribute information on the basis of the system information file by using the system server 260, and provide a plurality of compilation processes on the basis of the provided system attribute information. The system information file may include at least one of system version information, update time information, information about a storage space, model information, or specification information. For example, a system file may include system attribute information related to hardware and software. The system attribute information may include at least one system attribute information (e.g., version 0000, update time 23:20, etc.) of a map format pairing a key and a value. Providing the system attribute information is for preventing erroneous operation caused by inheriting a lock state of the system information file at the time of fork for providing the plurality of compilation processes. For example, to provide the compilation process, respective threads of an install demon process may access the system information file and change the system information file into a lock state and, after acquiring system information, change the system information file into an unlock state. In response to a second thread performing a fork operation and providing a new compilation process in a state in which a first thread of the install demon process accesses the system information file and the system information file is locked, a situation may occur in which the new compilation process cannot access the system information file due to a lock of the system information file. To prevent the above-mentioned lock state inheritance, the processor 120 of various embodiments of the present disclosure may provide system attribute information by using the system server 260, and control a compilation process including the system attribute information to be forked by using the install demon process. According to various embodiments, by controlling the compilation process including the system attribute information to be forked, the processor 120 may omit an operation of accessing the system information file by using the install demon process and/or an operation of controlling a lock/unlock state of the system information file. According to an embodiment, the system attribute information may include at least one of system version information, update time information, information about a storage space, model information, or specification information. The system attribute information may be constructed in a map format pairing a key and a value. According to an embodiment, the system attribute information may additionally include attribute information (e.g., size information) of each application program.

According to various embodiments, the processor 120 may determine the number of a plurality of compilation processes for performing parallel compilation of a plurality of application programs on the basis of the number of available cores. For example, the processor 120 may identify the number of currently available cores among a plurality of cores included in the processor 120, by using the system server 260, and determine the number of task pools for parallel compilation on the basis of the identified number of available cores. The number of available cores may be determined on the basis of a system load. The maximum number of task pools for parallel compilation may correspond to the number of the plurality of cores included in the processor 120. The maximum number of task pools for parallel compilation may be the maximum number of compilation processes. By limiting the number of task pools for parallel compilation or compilation processes to the number of the plurality of cores included in the processor 120, the processor 120 may prevent a system load from being suddenly increased because context switching frequently takes place due to a state transition of the compilation processes.

According to an embodiment, on the basis of the determined number of task pools, the processor 120 may provide a plurality of compilation processes for performing parallel compilation of a plurality of application programs included in a first application list. For instance, the processor 120 may identify whether a currently vacant task pool exists by using the system server 260, and in response to the currently vacant task pool existing, the processor 120 may provide compilation processes of a number corresponding to the number of vacant task pools by using the install demon process. According to an embodiment, in response to the currently vacant task pool existing, the processor 120 may provide a compilation request signal for at least one application program by using the system server 260, and provide at least one compilation process through the install demon process on the basis of the compilation request signal. For example, in response to two currently vacant task pools being identified, the processor 120 may provide a first compilation process for compiling a first application program and a second compilation process for compiling a second application program, by using the install demon process. In response to the currently vacant task pool not existing, the processor 120 may wait until a vacant task pool is provided. In response to the vacant task pool being provided, the processor 120 may provide the compilation process by using the install demon process. According to an embodiment, the processor 120 may allocate the compilation process according to the performance of a core. For example, the processor 120 may divide available cores into a high-performance core (or big core) and a low-performance core (or little core), and allocate a corresponding compilation process to any one of the high-performance core or the low-performance core on the basis of attribute information (e.g., size information) of an application program which will be compiled. For example, in response to the attribute information of the application program which will be compiled satisfying a first specified condition (e.g., in response to a size of the application program which will be compiled being greater than or being the same as a previously set size), the processor 120 may allocate the corresponding compilation process to a task pool corresponding to the high-performance core. In another example, in response to the attribute information of the application program which will be compiled satisfying a second specified condition (e.g., in response to the size of the application program which will be compiled being less than the previously set size), the processor 120 may allocate the corresponding compilation process to a task pool corresponding to the low-performance core.

According to an embodiment, the processor 120 may perform parallel compilation of each of a plurality of application programs through a plurality of compilation processes provided by using the install demon process. According to an embodiment, the processor 120 may perform compilation of each of the plurality of application programs on the basis of system attribute information, through the plurality of compilation processes. For example, the processor 120 may determine a compilation degree (or level) of each of the plurality of application programs on the basis of the system attribute information, through the plurality of compilation processes, and perform compilation of each of the plurality of application programs on the basis of the determined compilation degree. According to an embodiment, by using the install demon process, the processor 120 may sense whether compilation of each application program is successfully completed. For example, the processor 120 may sense compilation completion or non-completion (or compilation success or non-success) for a corresponding application program by using each compilation process of the install demon process, and provide a response signal representing the compilation completion or non-completion. The response signal representing the compilation completion or non-completion may include information of a corresponding application program, and/or information (e.g., a completion flag or a failure flag) representing compilation completion or failure. According to an embodiment, the processor 120 may identify an application program which has been completed to be compiled from the response signal representing the compilation completion or non-completion, by using the system server 260, and provide a compilation completion list including the identified application program. According to an embodiment, the processor 120 may identify an application program which has failed to be compiled from the response signal representing the compilation completion or non-completion, by using the system server 260, and provide a compilation failure list including the identified application program. According to an embodiment, by using the system server 260, the processor 120 may identify an application program in which a response signal representing compilation completion or non-completion is not provided within a specified time from the install demon process, and determine the identified application program as an application program which has failed to be parallel compiled. For example, in response to a response signal representing compilation completion or non-completion of a corresponding application program not being provided within a specified time (e.g., about 10 seconds) from a compilation request time point of the application program or a compilation process provision time point of the corresponding application program, the processor 120 may determine the corresponding application program as an application program which has failed to be parallel compiled. The specified time may be previously set as a value previously acquired through an experiment. According to an embodiment, the processor 120 may provide a compilation failure list including an application program which has failed to be parallel compiled. According to another embodiment, the processor 120 may add a compilation failure flag to the application program which has failed to be parallel compiled, within the first application list.

According to various embodiments, in response to at least one application program which has failed to be compiled during a booting operation existing, the processor 120 may perform a rebooting operation, and perform series (or sequential) compilation of the at least one application program which has failed to be compiled. According to an embodiment, the processor 120 may identify that the at least one application program which has failed to be compiled exists, on the basis of the compilation failure list, or the compilation failure flag added within the first application list.

In response to the at least one application program which has failed to be compiled existing, the processor 120 may perform rebooting after the booting operation is completed, and perform series compilation of the at least one application program which has failed to be compiled. For example, in response to an application program A and an application program B having failed to be compiled, the processor 120 may provide a compilation process for compiling the application program A by using the install demon process during the rebooting operation and, in response to compilation of the application program A being completed through the provided compilation process, the processor 120 may provide a compilation process for compiling the application program B.

According to various embodiments, the electronic device 101 may include a display (e.g., the display device 160 of FIG. 1), the processor 120 electrically connected to the display 160 and including a plurality of cores, and a memory (e.g., the memory 130 of FIG. 1) electrically connected to the processor 120. The memory 130 may be configured to store a plurality of application programs, and may store instructions which, at execution, allow the processor to perform parallel compilation of two or more application programs among the plurality of application programs by using two or more cores among the plurality of cores during a booting operation, and in response to at least one application program which has failed to be compiled being sensed, perform a rebooting operation, and perform series compilation of the at least one application program which has failed to be compiled, by using one core among the plurality of cores during the rebooting operation.

According to various embodiments, the instructions may allow to provide system attribute information on the basis of a system information file during the booting operation, and provide two or more compilation processes on the basis of the system attribute information, and perform the parallel compilation of the two or more application programs by using the two or more compilation processes, and the system attribute information may include at least one system information included of a key and a value.

According to various embodiments, the instructions may allow to determine the number of available cores during the booting operation, and provide the two or more compilation processes on the further basis of the number of available cores.

According to various embodiments, the instructions may allow to determine the number of compilation processes which will be provided, on the basis of the number of available cores.

According to various embodiments, the instructions may allow to determine an available core which will be allocated the compilation process, on the basis of the performance of the available core, and attribute information of an application program corresponding to the provided compilation process.

According to various embodiments, the attribute information of the application program may include a size of the application program.

According to various embodiments, the instructions may allow to sense whether compilation of each of the two or more application programs is completed within a specified time, and determine at least one application program which has not been completed to be compiled within the specified time, as the application program which has failed to be compiled.

According to various embodiments, the instructions may allow to sense at least one of a compilation process provision error or a compilation process operation error, and determine an application program corresponding to an erroneous compilation process, as the application program which has failed to be compiled.

According to various embodiments, the electronic device 101 may include the display 160, the processor 120 electrically connected to the display 160 and including a plurality of cores, and the memory 130 electrically connected to the processor 120. The memory 130 may be configured to store a plurality of application programs, and may store instructions which, at execution, allow the processor to provide system attribute information on the basis of a system information file, during a booting operation, and provide a plurality of compilation processes on the basis of the provided system attribute information, and perform parallel compilation of two or more application programs among the plurality of application programs by using the provided plurality of compilation processes.

According to various embodiments, the instructions may allow to determine the number of available cores during the booting operation, and determine the number of compilation processes which will be provided on the basis of the number of available cores, and provide the plurality of compilation processes on the basis of the determined number.

According to various embodiments, the instructions may include an instruction which allows to determine an available core which will be allocated the compilation process, on the basis of the performance of the available core, and attribute information of an application program corresponding to the provided compilation process, and the processor may allow to determine the available core which will be allocated the compilation process, on the basis of the performance of the available core, and the attribute information of the application program corresponding to the provided compilation process.

According to various embodiments, the instructions may allow to in response to at least one application program which has failed to be compiled being sensed, perform a rebooting operation, and perform series compilation of the at least one application which has failed to be compiled by using one core among the plurality of cores during the rebooting operation.

Figure 3:
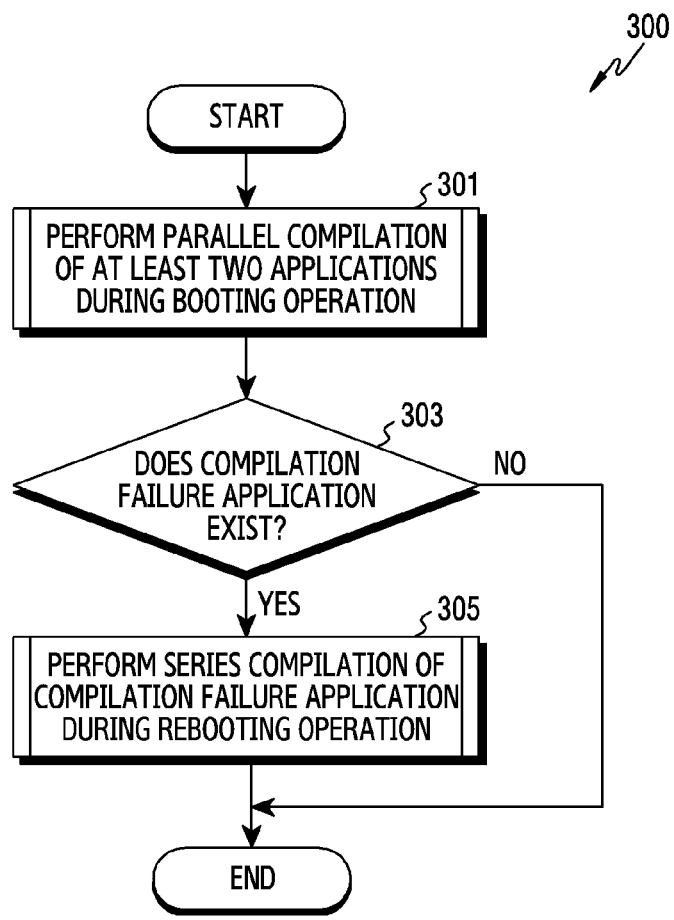
FIG. 3 is a flowchart for compiling an application program during a booting operation in an electronic device of various embodiments.

FIG. 3 is a flowchart 300 for compiling an application program during a booting operation in an electronic device of various embodiments. In an embodiment below, respective operations may be performed in sequence as well, but are not necessarily performed in sequence. For example, the order of the respective operations may be changed as well, and at least two operations may be performed in parallel as well. The electronic device of FIG. 3 may be the electronic device 101 of FIG. 1.

Referring to FIG. 3, in operation 301, the electronic device (e.g., the processor 120) of various embodiments may perform parallel compilation of two or more application programs during a booting operation. According to an embodiment, in response to a booting event being sensed, the processor 120 may perform the booting operation and, during the booting operation, perform parallel compilation of two or more application programs among a plurality of application programs installed in the electronic device. The processor 120 may sense the booting event on the basis of at least one of a user input for a power on/off button, a user input for factory reset, or a wired/wireless firmware upgrade event (e.g., a firmware over the air (fota) event), and perform the booting operation. During the booting operation, the processor 120 may acquire a first application list through a system server (the system server 260 of FIG. 2). The first application list may include information of application programs which will be AOT compiled during the booting operation among the plurality of application programs installed in the electronic device. During the booting operation, the processor 120 may provide system attribute information on the basis of a system information file. The processor 120 may provide a plurality of compilation processes (e.g., dex2oat processes) on the basis of the number of currently available cores and the system attribute information. By using the provided plurality of compilation processes, the processor 120 may perform parallel compilation of a plurality of application programs. According to various embodiments, the processor 120 may perform parallel compilation of an application program by using the system server 260 and an install demon process during the booting operation. The system server 260 may be an Android application process which is executed in the zygote 252. For example, the processor 120 may provide the first application list, provide the system attribute information, or identify the number of available cores, through the system server 260. The processor 120 may provide compilation request signals for each of two or more application programs included in the first application list, on the basis of the system attribute information and the number of available cores, by using the system server 260, and provide compilation processes responsive to compilation request signals by using the install demon process. The processor 120 may allocate the provided compilation processes to the available cores, to perform parallel compilation of each of two or more application programs, and may sense compilation completion or non-completion of each of the application programs by using the install demon process. By using the install demon process, the processor 120 may provide a response signal representing compilation completion or non-completion of each of application programs.

According to various embodiments, in operation 303, the electronic device (e.g., the processor 120) may determine whether an application program which has failed to be compiled exists. According to an embodiment, the processor 120 may determine compilation completion or non-completion and/or compilation failure or non-failure of an application program, on the basis of whether a response representing compilation completion or non-completion of each application program is sensed within a specified time. For example, in response to the response signal about the compilation completion or non-completion being sensed within the specified time (e.g., about 10 seconds) from a time point of provision of a compilation request signal for a first application program through the system server 260, the processor 120 may determine the compilation completion or non-completion of the first application program on the basis of completion and/or failure information included in the response signal. For another example, in response to the response signal about the compilation completion or non-completion not being sensed within the specified time (e.g., about 10 seconds) from a time point of provision of a compilation request signal for a second application program through the system server 260, the processor 120 may determine that compilation of the second application program has failed. According to an embodiment, the processor 120 may sense a compilation process provision error or a compilation process operation error by using an install demon process 804, and determine that compilation of an application program corresponding to an erroneous compilation process has failed. According to an embodiment, the processor 120 may provide at least one of a compilation completion list representing an application program which has been successfully completed to be compiled, or a compilation failure list representing an application program which has failed to be compiled. According to an embodiment, the processor 120 may add a compilation success flag or compilation failure flag for each of application programs, within a first application list.

According to various embodiments, in response to the application program which has failed to be compiled existing, in operation 305, the electronic device (e.g., the processor 120) may perform series compilation of the application program which has failed to be compiled, during a rebooting operation. According to an embodiment, in response to the application program which has failed to be compiled existing, the processor 120 may perform the rebooting operation after completing the booting operation. The processor 120 may identify at least one application program which will be compiled during the rebooting operation, on the basis of at least one of a compilation failure list, or a first application list adding a compilation failure flag. The processor 120 may perform series compilation of the identified at least one application program. According to various embodiments, the processor 120 may perform the series compilation of the application program by using the system server 260 and the install demon process during the rebooting operation. For example, the processor 120 may provide a compilation request signal for one application program among the identified at least one application program, through the system server 260, and provide one compilation process responsive to the compilation request signal by using the install demon process. The processor 120 may allocate the provided compilation process to a first available core, to compile a corresponding application program. The processor 120 may sense compilation completion of the corresponding application program by using the install demon process, and provide a response representing the compilation completion. In response to the response representing the compilation completion being provided, the processor 120 may provide a compilation request signal for another application program among the identified at least one application program, and provide one compilation process responsive to the compilation request signal by using the install demon process. By repeating such a scheme, the processor 120 may perform the series compilation of the at least one application program.

Figure 4A:
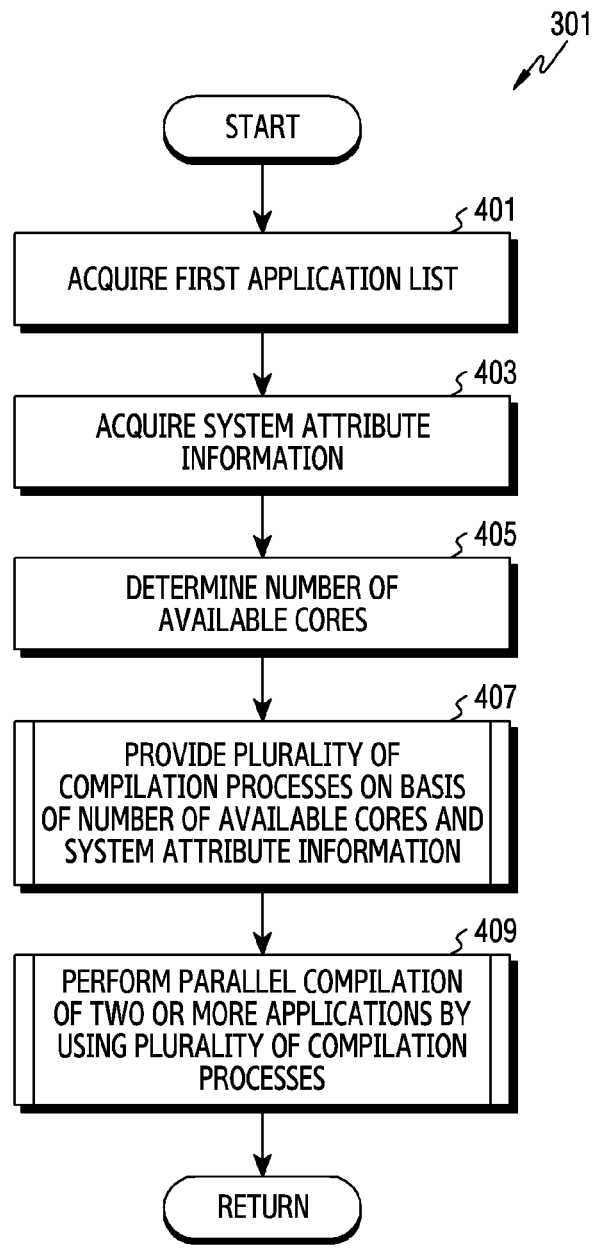
FIG. 4A is a flowchart for performing parallel compilation of a plurality of application programs during a booting operation in an electronic device of various embodiments.
Figure 4B:
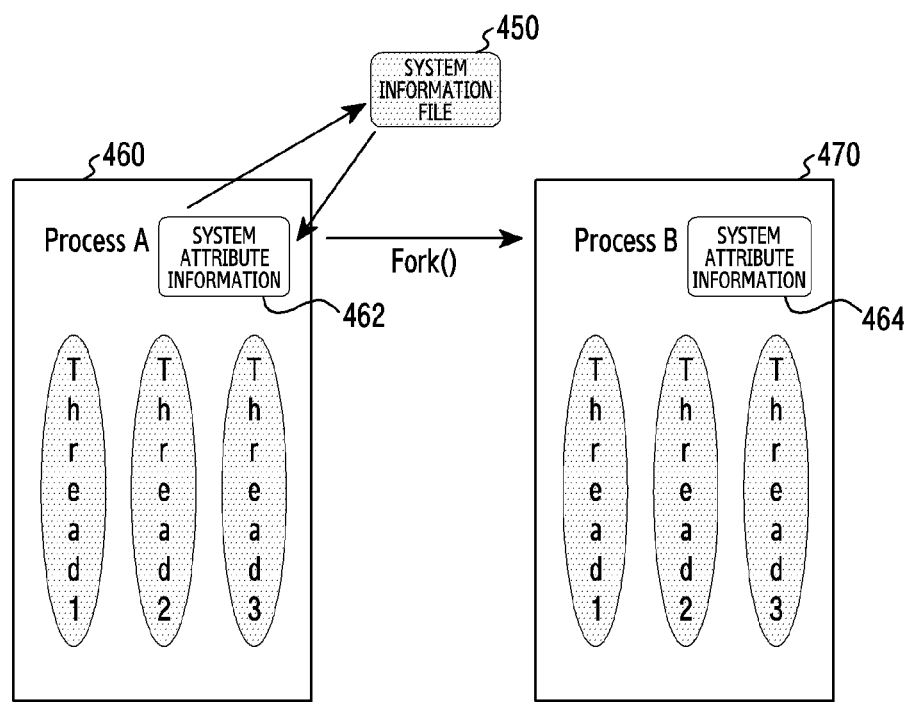
FIG. 4B illustrates an example of providing a process for compilation during a booting operation in an electronic device of various embodiments.

FIG. 4A is a flowchart 301 for performing parallel compilation of a plurality of application programs during a booting operation in an electronic device of various embodiments. Operations of FIG. 4A described below may be at least some operations of operation 301 of FIG. 3. In an embodiment below, respective operations may be performed in sequence as well, but are not necessarily performed in sequence. For example, the order of the respective operations may be changed as well, and at least two operations may be performed in parallel as well. The electronic device of FIG. 4A may be the electronic device 101 of FIG. 1. Below, at least some operations of the electronic device (e.g., the processor 120) will be described with reference to FIG. 4B. FIG. 4B illustrates an example of providing a process for compilation during a booting operation in the electronic device of various embodiments.

Referring to FIG. 4A, in operation 401, the electronic device (e.g., the processor 120) of various embodiments may acquire a first application list representing a plurality of application programs which will be AOT compiled during a booting operation. The first application list may include information about at least one of, for example, a core application program, a system application program, an application program used by other application programs, or an application program having a history having been used within a previously set period of time (e.g., within 7 days from a time point of start of the booting operation) in the electronic device. According to an embodiment, by using a system server (the system server 260 of FIG. 2), the processor 120 may provide the first application list on the basis of at least one of a compilation completion list or an install application list. The compilation completion list may include information of at least one application program which has been successfully completed to be parallel compiled or series compiled during a previous booting operation. The information of the application program included in the compilation completion list may include at least one of an ID of the application program, a name of the application program, or version information of the application program. The install application list may be a list representing all application programs installed in the electronic device, and may be provided on the basis of apk files installed in the electronic device. The install application list may include at least one of the ID of the application program, the name of the application program, or the version information of the application program. For example, the processor 120 may compare the installation application list and the compilation completion list through the system server 260, and select an application program which is included in the installation application list but is not included in the compilation completion list and/or an application program which is included in the compilation completion list and the installation application list but has different version information, and provide the first application list including the selected application programs. The application program which is included in the compilation completion list and the installation application list but has the different version information may be an application program which has been updated after AOT compilation has been successfully performed. According to an embodiment, in response to initially performing the booting operation in the electronic device, the compilation completion list does not exist, so the processor 120 may provide the first application list on the basis of the installation application list, through the system server 260. For example, the processor 120 may select all application programs included in the installation application list, and provide the first application list including the selected all application programs.

According to various embodiments, in operation 403, the electronic device (e.g., the processor 120) may provide system attribute information on the basis of a system information file. The system attribute information may be constructed in a map format pairing a key and a value. Providing the system attribute information is for preventing an erroneous operation caused by inheriting a lock state of the system information file at the time of fork for providing a plurality of compilation processes. According to an embodiment, the system attribute information may include at least one of system version information, update time information, information about a storage space, model information, or specification information. According to an embodiment, the system attribute information may additionally include attribute information (e.g., size information) of each application program.

According to various embodiments, in operation 405, the electronic device (e.g., the processor 120) may determine the number of currently usable cores. For example, to determine the number of task pools for parallel compilation, the processor 120 may determine the number of currently available cores. The maximum number of task pools for parallel compilation may be determined as the number of a plurality of cores included in the processor 120. For example, in response to the processor 120 including four cores, the maximum number of task pools for parallel compilation may be limited to 4. According to an embodiment, by using the system server 260, the processor 120 may determine the number of available cores which is based on a system load.

According to various embodiments, in operation 407, the electronic device (e.g., the processor 120) may provide a plurality of compilation processes on the basis of the number of available cores and the system attribute information. According to an embodiment, the processor 120 may provide the plurality of compilation processes for performing parallel compilation of the plurality of application programs included in the first application list, on the basis of the number of task pools determined according to the number of available cores. For instance, by using the system server 260, the processor 120 may identify the number of currently usable cores (or identify the number of vacant task pools). The processor 120 may provide compilation request signals for compiling the application programs included in the first application list, on the basis of the number of usable cores, through the system server 260. The processor 120 may provide the plurality of compilation processes responsive to the compilation request signals, by using an install demon process, and allocate each of the provided plurality of compilation processes to the currently usable cores According to an embodiment, the processor 120 may perform fork in a scheme illustrated in FIG. 4B by using the install demon process, to provide the compilation process. Referring to FIG. 4B, the processor 120 may, for example, perform a fork operation (fork ( )) by using a process A 460 including system attribute information 462 provided from a system information file 450, thereby providing a process B 470 including system attribute information 464. The system attribute information 464 included in the process B 470 may be provided on the basis of the system attribute information 462 included in the process A 460. For instance, the system attribute information 464 included in the process B 470 may include the same information as the system attribute information 462 included in the process A 460. According to various embodiments, by controlling to fork the compilation process including the system attribute information, the processor 120 may omit an operation of accessing the system information file by using the install demon process, and/or an operation of controlling a lock/unlock state of the system information file. For example, in response to performing compilation of an application program by using threads of the process A 460, the processor 120 may use the system attribute information 462 included in the process A 460 without accessing the system information file 450. In response to performing compilation by using threads of the process B 470, the processor 120 may use the system attribute information 464 included in the process B 470 without accessing the system information file 450.

According to various embodiments, in operation 409, the electronic device (e.g., the processor 120) may perform parallel compilation of two or more applications by using the plurality of compilation processes. According to an embodiment, the processor 120 may compile the plurality of application programs in a pipeline scheme, by using the plurality of compilation processes allocated to the plurality of available cores. According to an embodiment, the processor 120 may compile each of the plurality of application programs on the basis of the system attribute information, by using the plurality of compilation processes. For example, the processor 120 may determine a compilation degree (or level) for a corresponding application program on the basis of the system attribute information, by using each compilation process, and compile the corresponding application program on the basis of the determined compilation degree. According to an embodiment, by using the install demon process, the processor 120 may sense compilation completion or failure for the plurality of compilation processes. By using the install demon process, the processor 120 may provide a response signal representing compilation completion or non-completion of an application program. The processor 120 may sense whether a response signal about compilation completion or non-completion of each application program is sensed within a specified time, through the system server 260, and determine compilation completion or non-completion of each application program on the basis of the sensing result.

Figure 5:
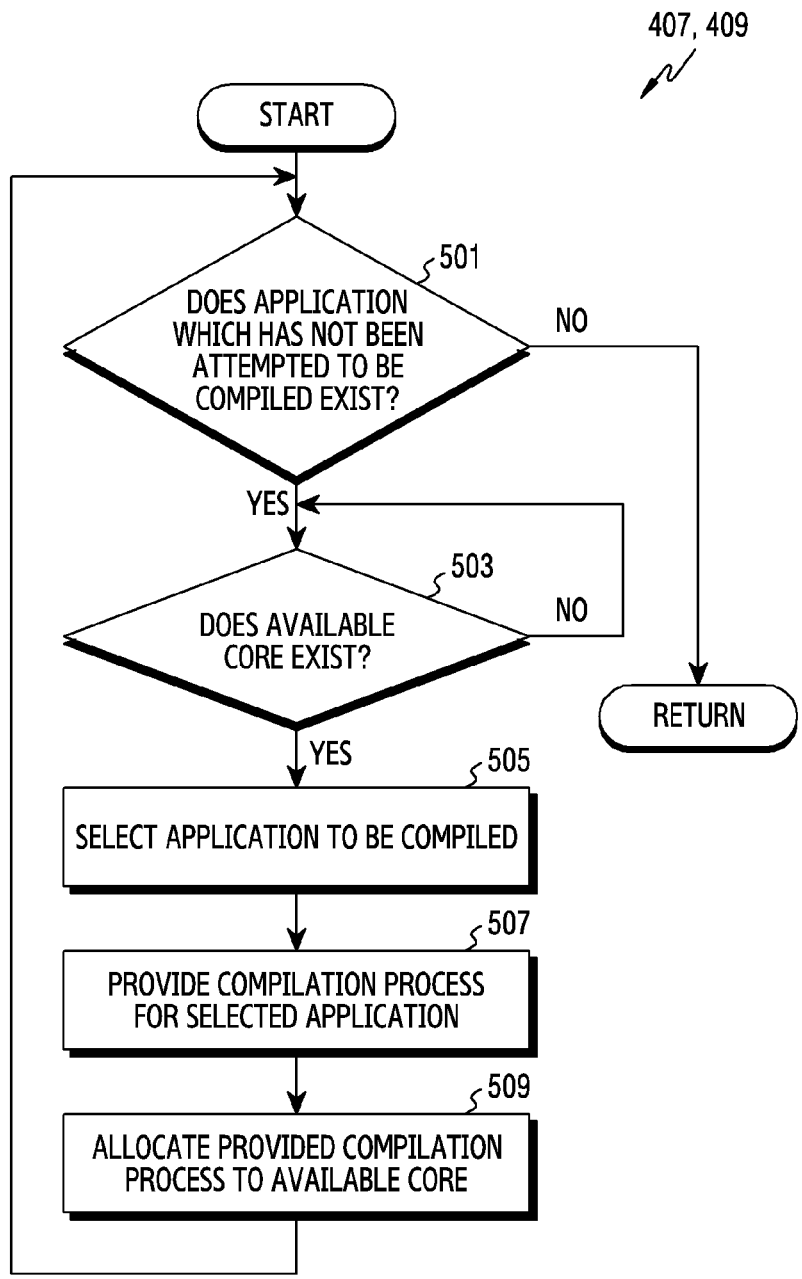
FIG. 5 is a flowchart for performing parallel compilation of a plurality of application programs according to the number of available cores during a booting operation in an electronic device of various embodiments.

FIG. 5 is a flowchart 407, 409 for performing parallel compilation of a plurality of application programs according to the number of available cores during a booting operation in an electronic device of various embodiments. Operations of FIG. 5 described below may be at least some operations of operation 407 and operation 409 of FIG. 4. In an embodiment below, respective operations may be performed in sequence as well, but are not necessarily performed in sequence. For example, the order of the respective operations may be changed as well, and at least two operations may be performed in parallel as well. The electronic device of FIG. 5 may be the electronic device 101 of FIG. 1.

Referring to FIG. 5, in operation 501, the electronic device (e.g., the processor 120) of various embodiments may determine whether an application program which has not been attempted to be compiled exists among application programs included in a first application list. According to an embodiment, the processor 120 may determine whether the application program which has not been attempted to be compiled exists among the application programs included in the first application list, through a system server (the system server 260 of FIG. 2). For example, the processor 120 may determine whether an application program for which a compilation request signal has not been provided exists among the application programs included in the first application list.

According to various embodiments, in response to the application program which has not been attempted to be compiled existing, in operation 503, the electronic device (e.g., the processor 120) may determine whether a currently usable core exists. For example, the processor 120 may determine whether an available core not currently allocated a process exists, through the system server 260.

According to various embodiments, in response to the usable core existing, in operation 505, the electronic device (e.g., the processor 120) may select an application program which will be compiled. According to an embodiment, the processor 120 may select one application program which will be compiled among the application programs which have not been attempted to be compiled, within a first application list, through the system server 260.

According to various embodiments, in operation 507, the electronic device (e.g., the processor 120) may provide a compilation process for the selected application program. According to an embodiment, the processor 120 may provide a compilation request signal for the selected application program through the system server 260, and provide a compilation process responsive to the compilation request signal through an install demon process. According to an embodiment, the provided compilation process may be provided to have system attribute information.

According to various embodiments, in operation 509, the electronic device (e.g., the processor 120) may allocate the provided compilation process to the available core. According to an embodiment, the processor 120 may determine the available core which will be allocated the provided compilation process, on the basis of attribute information (e.g., size information) of the selected application program and the performance of the available core. For example, the processor 120 may divide a plurality of available cores included in the processor 120 into a high-performance core and a low-performance core according to performance, and allocate a corresponding compilation process to any one of the high-performance core and the low-performance core on the basis of whether the attribute information of the selected application program satisfies a specified condition. For instance, in response to the attribute information of the application program which will be compiled satisfying a first specified condition (e.g., in response to a size of the application program which will be compiled being greater than or being same as a previously set size), the processor 120 may allocate the corresponding compilation process to the high-performance core. In another example, in response to the attribute information of the application program which will be compiled satisfying a second specified condition (e.g., in response to the size of the application program which will be compiled being less than the previously set size), the processor 120 may allocate the corresponding compilation process to the low-performance core. According to various embodiments, the processor 120 may compile the selected application program by using the available core which has been allocated the compilation process.

Figure 6:
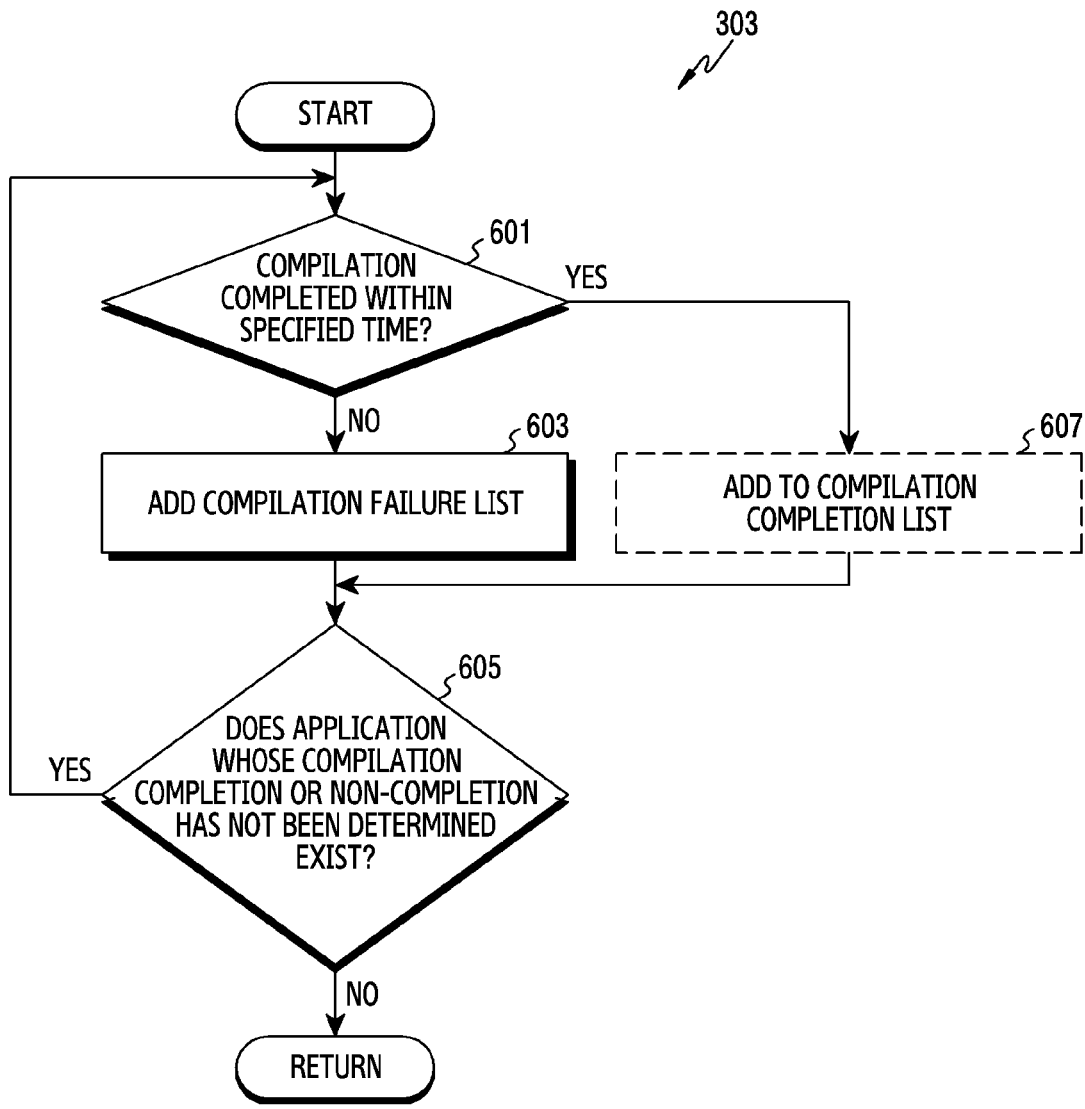
FIG. 6 is a flowchart for managing an application program which has failed to be parallel compiled during a booting operation in an electronic device of various embodiments.

FIG. 6 is a flowchart 303 for managing an application program which has failed to be parallel compiled during a booting operation in an electronic device of various embodiments. Operations of FIG. 6 described below may be at least some operations of operation 303 of FIG. 3. In an embodiment below, respective operations may be performed in sequence as well, but are not necessarily performed in sequence. For example, the order of the respective operations may be changed as well, and at least two operations may be performed in parallel as well. The electronic device of FIG. 6 may be the electronic device 101 of FIG. 1. Below, operation expressed with a dotted line may be omitted according to an embodiment.

Referring to FIG. 6, in operation 601, the electronic device (e.g., the processor 120) of various embodiments may determine whether compilation of a selected application program is completed within a threshold time. According to an embodiment, the processor 120 may determine compilation completion or non-completion and/or compilation failure or non-failure of the corresponding application program, on the basis of whether a response about compilation completion or non-completion of the application program which has been requested to be compiled is sensed within a specified time. The response about the compilation completion or non-completion may be provided by the install demon process. For example, in response to a response signal about compilation completion or non-completion of a first application program not being sensed within a specified time (e.g., about 10 seconds) from a time point of provision of a compilation request signal for the first application program through a system server (the system server 260 of FIG. 2), the processor 120 may determine that compilation of the first application program has not been completed (or has failed) within the specified time. In another example, in response to the response signal about the compilation completion or non-completion of the first application program being sensed within the specified time (e.g., about 10 seconds) from the time point of provision of the compilation request signal for the first application program through the system server 260, the processor 120 may determine whether the compilation of the first application program has been completed within the specified time, on the basis of information included in the response signal.

According to various embodiments, in response to the compilation of the selected application program having not been completed within the specified time, in operation 603, the electronic device (e.g., the processor 120) may add information about the selected application program to a compilation failure list. For example, the processor 120 may add the information about the application program which has failed to be compiled, to the compilation failure list through the system server 260.

According to various embodiments, in response to the compilation of the selected application program having been completed within the specified time, in operation 607, the electronic device (e.g., the processor 120) may add the information about the selected application program to a compilation completion list. For example, the processor 120 may add the information about the application program which has been completed to be compiled, to the compilation completion list through the system server 260.

According to various embodiments, in operation 605, the electronic device (e.g., the processor 120) may determine whether an application whose compilation completion or non-completion has not been determined exists among applications included in a first application list. For example, the processor 120 may determine whether an application program not included in the compilation completion list or the compilation failure list exists among the application programs included in the first application list. In response to the application whose compilation completion or non-completion has not been determined existing among the applications included in the first application list, the processor 120 may select the application whose compilation completion or non-completion has not been determined, and return to operation 601 and perform subsequent operations.

In FIG. 6 above, a description has been made for a scheme of providing at least one of a compilation completion list representing an application program which has been successfully completed to be compiled, or a compilation failure list representing an application program which has failed to be compiled in the electronic device (e.g., the processor 120), but the present disclosure is not limited to this. For example, according to various embodiments, the processor 120 may add a flag representing compilation success or non-success to the first application list, without providing the compilation completion list and/or the compilation failure list. For example, the processor 120 may add a compilation success flag or a compilation failure flag for each of application programs included in the first application list.

Figure 7:
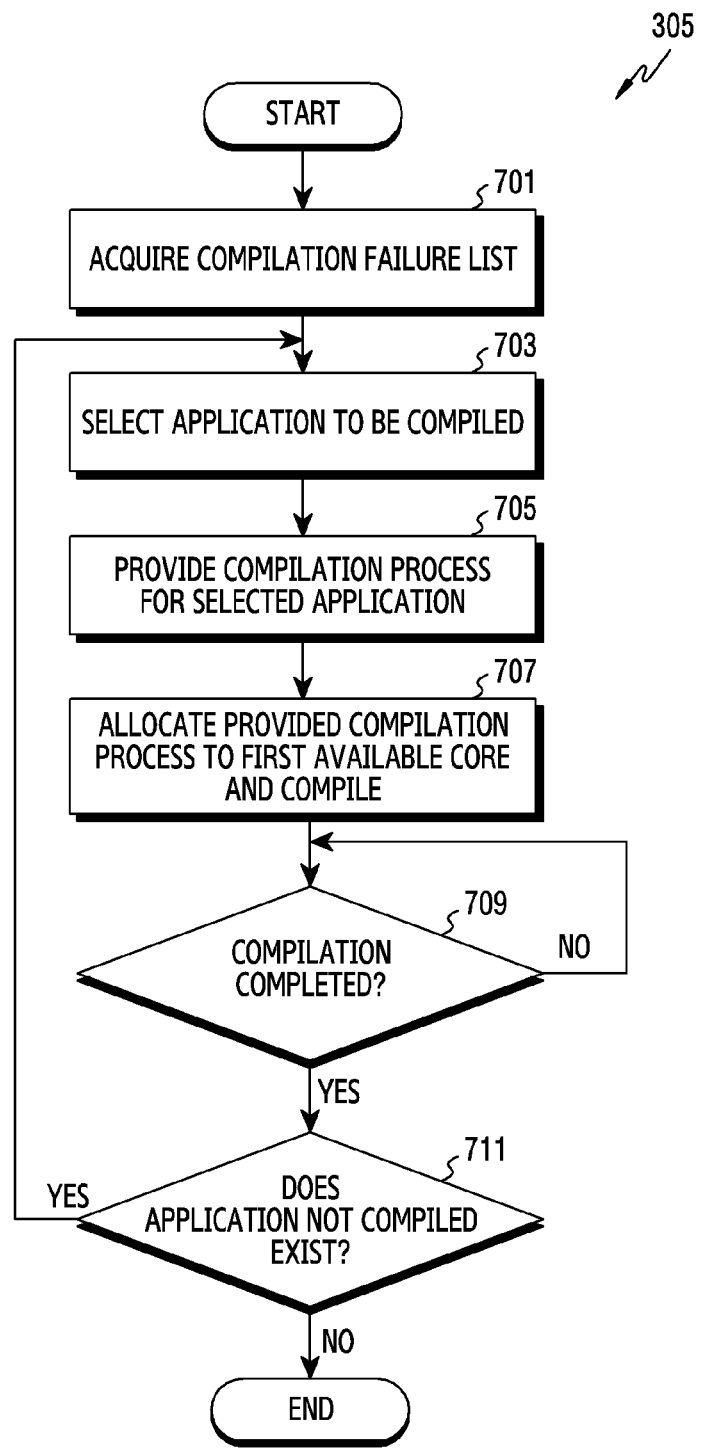
FIG. 7 is a flowchart for performing, during a rebooting operation, series compilation of an application program which has failed to be parallel compiled in an electronic device of various embodiments.

FIG. 7 is a flowchart 305 for performing, during a rebooting operation, series compilation of an application program which has failed to be parallel compiled in an electronic device of various embodiments. Operations of FIG. 7 described below may be at least some operations of operation 305 of FIG. 3. In an embodiment below, respective operations may be performed in sequence as well, but are not necessarily performed in sequence. For example, the order of the respective operations may be changed as well, and at least two operations may be performed in parallel as well. The electronic device of FIG. 7 may be the electronic device 101 of FIG. 1.

Referring to FIG. 7, in operation 701, the electronic device (e.g., the processor 120) of various embodiments may acquire a compilation failure list. The compilation failure list may include information about at least one application program which has been attempted to be parallel compiled during a booting operation but has failed to be parallel compiled.

According to various embodiments, in operation 703, the electronic device (e.g., the processor 120) may select an application program which will be compiled. According to an embodiment, the processor 120 may select one application program which will be compiled, in the compilation failure list, through a system server (the system server 260 of FIG. 2).

According to various embodiments, in operation 705, the electronic device (e.g., the processor 120) may provide a compilation process for the selected application program. According to an embodiment, the processor 120 may provide a compilation request signal for the selected application program through the system server 260, and provide a compilation process responsive to the compilation request signal through the install demon process.

According to various embodiments, in operation 707, the electronic device (e.g., the processor 120) may allocate the provided compilation process to a first available core, to perform series compilation of the selected application program. According to an embodiment, the processor 120 may select the first available core for performing series compilation of at least one application program among a plurality of available cores, and allocate the compilation process to the selected first available core. By using the selected first available core, the processor 120 may perform the compilation of the selected application program. By using the install demon process, the processor 120 may sense compilation completion of the selected application program, and provide a response signal representing compilation completion of the selected application program.

According to various embodiments, in operation 709, the electronic device (e.g., the processor 120) may determine whether the compilation of the selected application program is completed. According to an embodiment, in response to a compilation completion response about the selected application program being sensed through the system serer 260, the processor 120 may determine that the compilation of the selected application program has been completed. According to an embodiment, in response to the compilation completion response about the selected application program not being sensed through the system serer 260, the processor 120 may wait until the compilation completion response about the selected application program is sensed.

According to various embodiments, in response to the compilation of the selected application program being completed, in operation 711, the electronic device (e.g., the processor 120) may determine whether an application program not compiled exists among the application programs included in the compilation failure list. The processor 120 may determine whether the application program not compiled exists among the application programs included in the compilation failure list through the system server 260. In response to the application program not compiled existing, the processor 120 may return to operation 701 and again perform subsequent operations.

Figure 8:
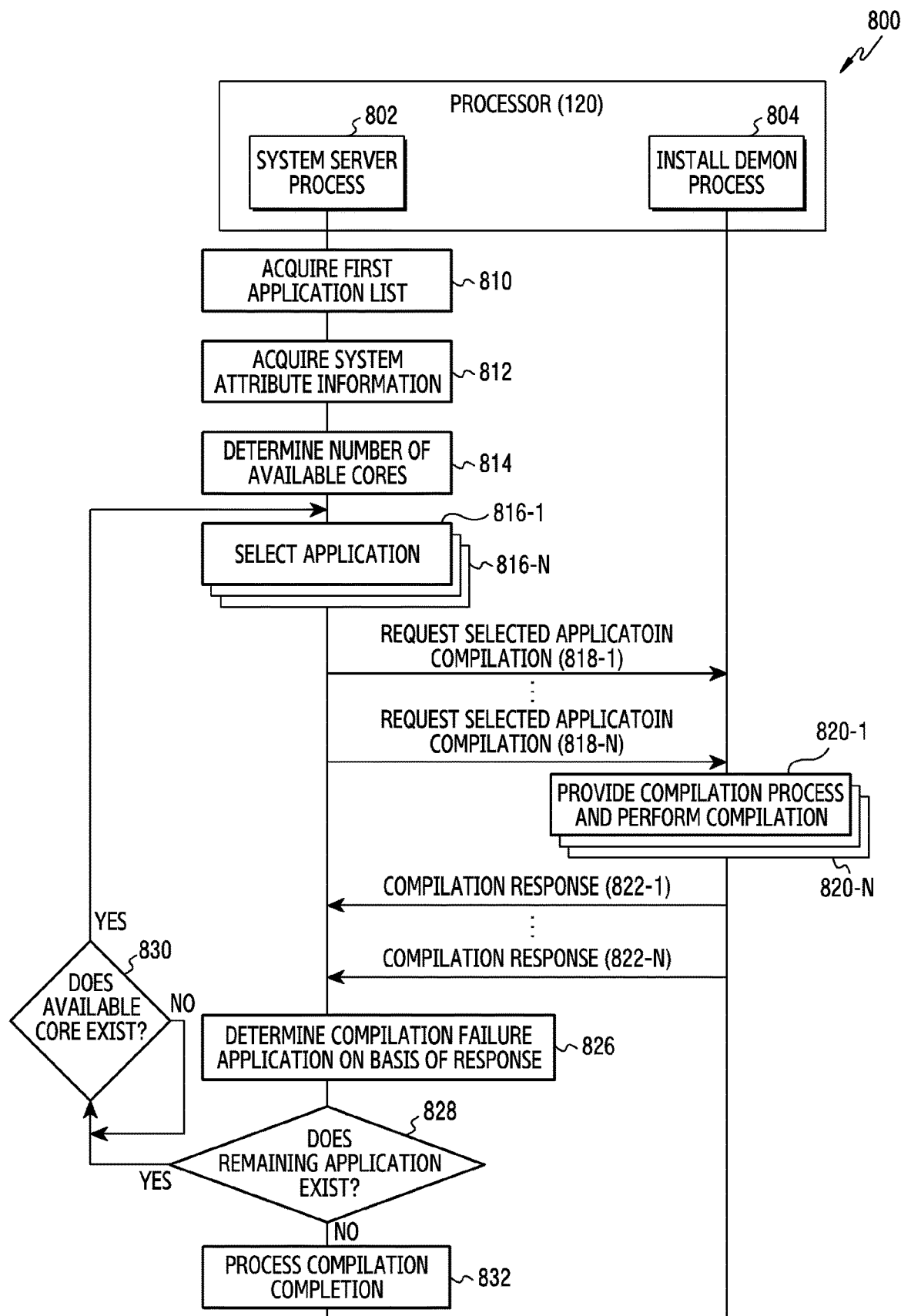
FIG. 8 is a signal flowchart for performing parallel compilation of a plurality of application programs by using a system server process and an install demon process in an electronic device of various embodiments.

FIG. 8 is a signal flowchart 800 for performing parallel compilation of a plurality of application programs by using a system server process and an install demon process in an electronic device of various embodiments. In an embodiment below, respective operations may be performed in sequence as well, but are not necessarily performed in sequence. For example, the order of the respective operations may be changed as well, and at least two operations may be performed in parallel as well. The processor 120 of FIG. 8 may be the processor 120 of FIG. 1.

Referring to FIG. 8, in operation 810, the processor 120 of various embodiments may acquire a first application list by using the system server process 802. According to an embodiment, the first application list may be acquired in a scheme which is at least partially the same as that described in operation 401 of FIG. 4.

According to various embodiments, in operation 812, the processor 120 may acquire system attribute information by using the system server process 802. According to an embodiment, the system attribute information may be acquired in a scheme which is at least partially the same as that described in operation 403 of FIG. 4. According to an embodiment, the system attribute information may be stored in a data structure. According to an embodiment, the system attribute information may be forwarded to the install demon process 804. According to an embodiment, the processor 120 may acquire the system attribute information by using the install demon process 804.

According to various embodiments, in operation 814, the processor 120 may determine the number of available cores by using the system server process 802. According to an embodiment, the number of available cores may be acquired in a scheme which is at least partially the same as that described in operation 405 of FIG. 4.

According to various embodiments, in operation 816-1 to operation 816-N, the processor 120 may select an application program in the first application list by using the system server process 802. According to an embodiment, by using the system server process 802, the processor 120 may select application programs of a number corresponding to the determined number of available cores among application programs included in the first application list. The N may be changed according to the number of available cores. For example, in response to the number of available cores being 2, in operation 816-1, the processor 120 may select a first application program among the application programs within the first application list by using the system server process 802, and in operation 816-2, the processor 120 may select a second application program among the application programs within the first application list. In another example, in response to the number of available cores being 3, in operation 816-1, the processor 120 may select a first application program among the application programs within the first application list, and in operation 816-2, the processor 120 may select a second application program among the application programs within the first application list, and in operation 816-N, the processor 120 may select a third application program among the application programs within the first application list. According to an embodiment, the processor 120 may simultaneously select application programs of a number corresponding to the number of available cores, or sequentially select.

According to various embodiments, in operation 818-1 to operation 818-N, the processor 120 may request for compilation of the selected application to the install demon process 804, by using the system server process 802. According to an embodiment, the processor 120 may provide compilation request signals for each of the selected application programs through the system server process 802, and forward the compilation request signals to the install demon process 804. For example, in response to two application programs being selected, in operation 818-1, the processor 120 may forward a compilation request signal for a first application program among the two selected application programs to the install demon process 804 through the system server process 802, and in operation 818-2, the processor 120 may forward a compilation request signal for a second application program among the two selected application programs to the install demon process 804 through the system server process 802. According to an embodiment, the maximum number of compilation request signals transmissible at one time to the install demon process 804 through the system server process 802 may be limited to the number of cores included in the processor 120. For example, the N may be less than or be equal to the number of cores included in the processor 120. Limiting the maximum number of compilation request signals transmissible at one time to the number of cores included in the processor 120 is for minimizing a system load by preventing context switching from frequently taking place due to a state transition of compilation processes. According to an embodiment, the processor 120 may simultaneously forward the compilation request signals for each of the selected application programs to the install demon process 804 by using the system server process 802, or sequentially forward.

According to various embodiments, in operation 820-1 to operation 820-N, the processor 120 may provide a plurality of compilation processes on the basis of the compilation request signals for each of the selected application programs by using the install demon process 804, and allocate the provided plurality of compilation processes to the available cores and perform compilation of each of the selected application programs. According to an embodiment, by performing a fork operation by using a binder thread of the install demon process 804, the processor 120 may provide the plurality of compilation processes. For example, in operation 820-1, by performing the fork operation by using a first thread of the install demon process 804, the processor 120 may provide a first compilation process of performing compilation of a first application program. In operation 820-N, by performing the fork operation by using an Nth thread of the install demon process 804, the processor 120 may provide an Nth compilation process of performing compilation of an Nth application program. According to an embodiment, by using the install demon process 804, the processor 120 may provide compilation processes of a number corresponding to the number of compilation request signals presented from the system server process 802. According to an embodiment, the processor 120 may provide a compilation process including system attribute information by using the install demon process 804. According to an embodiment, the processor 120 may determine the available core which will be allocated the compilation process for each application program, on the basis of the performance of the available core and attribute information (e.g., size information) of the application program. According to an embodiment, the processor 120 may sense a compilation process provision error or a compilation process operation error by using the install demon process 804, and process that compilation of an application program corresponding to an erroneous compilation process has failed.

According to various embodiments, in operation 822-1 to operation 822-N, the processor 120 may provide a response signal representing compilation completion or non-completion for each of the selected application programs by using the install demon process 804, and forward the response signals representing compilation completion or non-completion to the system server process 802. According to an embodiment, the processor 120 may sense compilation completion or failure for the selected application program, by using the install demon process 804. In response to the compilation completion being sensed by using the install demon process 804, the processor 120 may provide a response signal representing a compilation completion. In response to a compilation failure being sensed by using the install demon process 804, the processor 120 may provide a response signal representing the compilation failure. According to an embodiment, in response to compilation completion or non-completion of a first application program being sensed by using the install demon process 804, in operation 822-1, the processor 120 may forward a response signal representing the compilation completion or non-completion of the first application program to the system server process 802. According to an embodiment, in response to compilation completion or non-completion of an Nth application program being sensed by using the install demon process 804, in operation 822-N, the processor 120 may forward a response signal representing the compilation completion or non-completion of the Nth application program to the system server process 802. The response signal representing the compilation completion or non-completion may include information of a corresponding application program.

According to various embodiments, in operation 826, the processor 120 may determine a compilation failure application program on the basis of the response signal representing the compilation completion or non-completion by using the install demon process 804. According to an embodiment, the processor 120 may determine as the compilation failure application program, on the basis of application information included in the response signal representing the compilation failure, by using the system server 802. According to an embodiment, the processor 120 may sense whether a compilation completion response signal for each application program is received within a specified time by using the system server 802, and may determine an application program for which the compilation completion response signal is not received within the specified time, as the compilation failure application program.

According to various embodiments, in operation 828, by using the system server process 802, the processor 120 may determine whether an application which has not been attempted to be compiled exists among the application programs included in the first application list.

According to various embodiments, in response to the application which has not been attempted to be compiled existing, in operation 830, the processor 120 may determine whether an available core exists, by using the system server process 802. In response to the available core existing, the processor 120 may proceed to operations 816-1 to 816-N and again perform subsequent operation. In response to the available core not existing, the processor 120 may wait until the available core is provided.

According to various embodiments, in response to the application which has not been attempted to be compiled not existing, in operation 832, the processor 120 may perform compilation completion processing for the application programs of the first application list, by using the system server process 802. According to various embodiments, in response to the compilation failure application existing, the processor 120 may perform a rebooting operation and perform series compilation of the compilation failure applications. The series compilation may be performed as described in operation 305 of FIG. 3.

According to various embodiments, an operation method of the electronic device 101 may include performing parallel compilation of two or more application programs by using two or more cores among a plurality of cores included in the electronic device 101 during a booting operation, and in response to at least one application program which has failed to be compiled being sensed, performing a rebooting operation, and performing series compilation of the at least one application program which has failed to be compiled, by using one core among the plurality of cores during the rebooting operation.

According to various embodiments, performing the parallel compilation of the two or more application programs may include providing system attribute information on the basis of a system information file during the booting operation, and providing two or more compilation processes on the basis of the system attribute information, and performing the parallel compilation of the two or more application programs by using the two or more compilation processes, and the system attribute information may include at least one system information included of a key and a value.

According to various embodiments, providing the two or more compilation processes may include determining the number of available cores during the booting operation, and providing the two or more compilation processes on the further basis of the number of available cores.

According to various embodiments, providing the two or more compilation processes on the further basis of the number of available cores may include determining the number of compilation processes which will be provided on the basis of the number of available cores.

According to various embodiments, the method may further include determining an available core which will be allocated the compilation process, on the basis of the performance of the available core, and attribute information of an application program corresponding to the provided compilation process.

According to various embodiments, the attribute information of the application program may include a size of the application program.

According to various embodiments, the operation method of the electronic device 101 may further include sensing whether compilation of each of the two or more application programs is completed within a specified time, and determining at least one application program which has not been completed to be compiled within the specified time, as the application program which has failed to be compiled.

According to various embodiments, the operation method of the electronic device 101 may further include sensing at least one of a compilation process provision error or a compilation process operation error, and determining an application program corresponding to an erroneous compilation process, as the application program which has failed to be compiled.

Figure 9:
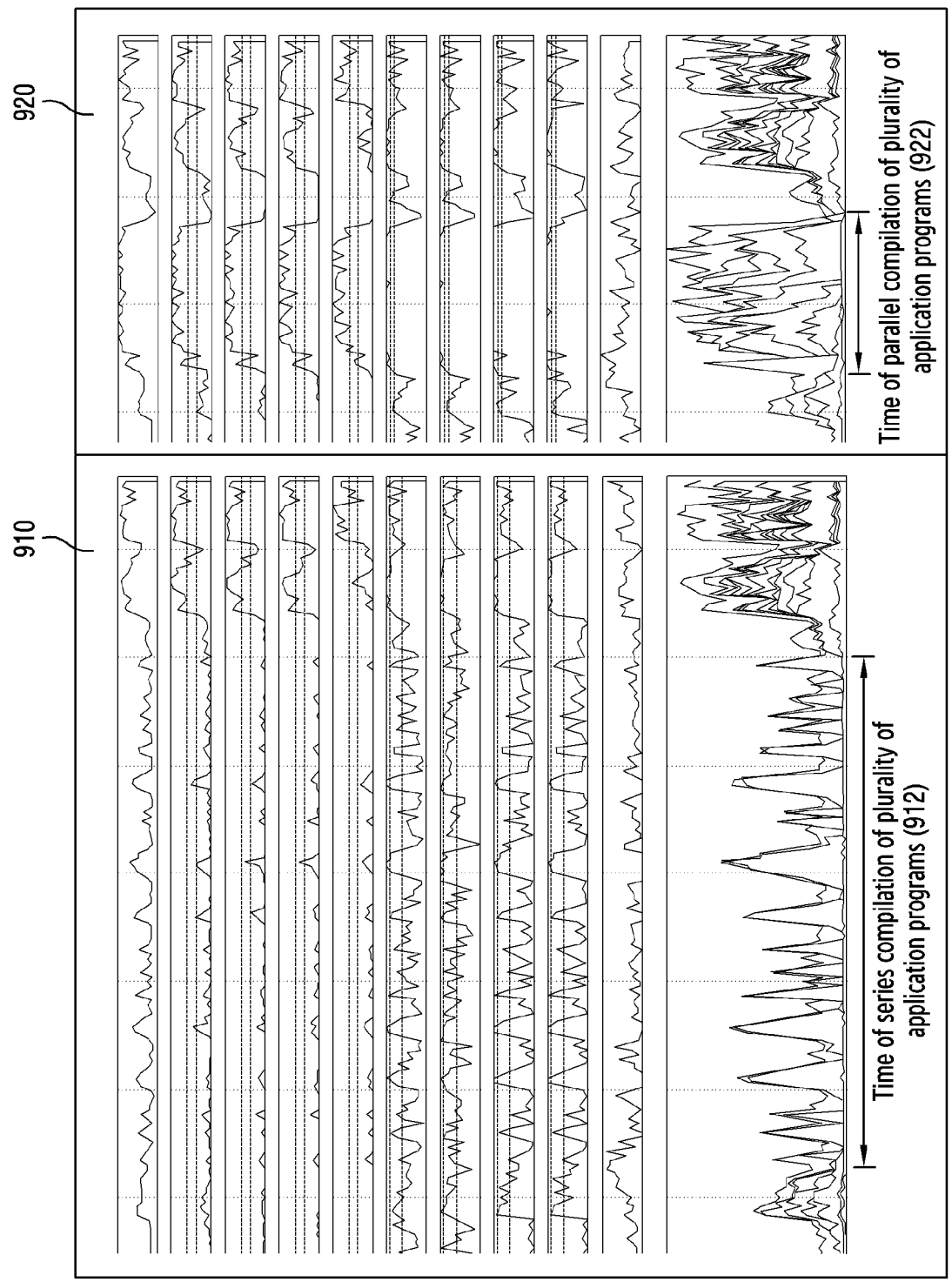
FIG. 9 is a performance graph of when performing series compilation of a plurality of application programs in an electronic device of a comparative example and a performance graph of when performing parallel compilation of a plurality of application programs of various embodiments of the present disclosure.

FIG. 9 is a performance graph 910 of when performing series compilation of a plurality of application programs in an electronic device of a comparative example and a performance graph 920 of when performing parallel compilation of the plurality of application programs of various embodiments of the present disclosure.

The performance graphs of FIG. 9 may represent that a time 922 of when performing the parallel compilation of the plurality of application programs according to various embodiments of the present disclosure is shorter than a time 912 of when performing the series compilation of the plurality of application programs in the comparative example in the electronic device (e.g., the electronic device 101 of FIG. 1). For example, in response to performing the series compilation of the plurality of application programs according to the comparative example in the electronic device 101 supporting an Android operating system, a total time required for a booting operation is about 140 seconds. In response to performing the parallel compilation of the plurality of application programs according to various embodiments of the present disclosure, a total time required for the booting operation may be about 100 seconds. By using a parallel compilation scheme, the electronic device of various embodiments of the present disclosure may efficiently use resources while minimizing a time required for compilation.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a display;
   a processor electrically connected to the display and comprising a plurality of cores; and
   a memory electrically connected to the processor,
   wherein the memory is configured to store a plurality of application programs, and stores instructions which, at execution, cause the processor to:
      generate a request signal to compile the plurality of application programs;
      based on the request signal, perform a first compilation on a first application program among the plurality of application programs by using a first core among the plurality of cores and a second compilation on a second application program among the plurality of application programs by using a second core among the plurality of cores during a booting operation, the first compilation and the second compilation being performed in parallel;
      determine whether a signal indicating that a respective compilation for an application program is complete is detected within a specified time from when the request signal is generated;
      determine an application program for which the signal has not been detected within the specified time among the plurality of application programs as at least one application program that has failed to be compiled in parallel;
      in response to detecting the at least one application program that has failed to be compiled in parallel, perform a rebooting operation;
      perform a series compilation on the at least one application program that has failed to be compiled in parallel, by using one core among the plurality of cores during the rebooting operation;
      provide system attribute information based on a system information file during the booting operation;
      provide two or more compilation processes based on the system attribute information;
      perform parallel compilation of the first application program and the second application program by using the two or more compilation processes;
      determine a number of available cores during the booting operation; and
      provide the two or more compilation processes based on the number of available cores.

2. The electronic device of claim 1, wherein
   the system attribute information comprises at least one system information comprised of a key and a value.

3. The electronic device of claim 1, wherein the instructions cause the processor to determine a number of compilation processes that will be provided, based on the number of available cores.

4. The electronic device of claim 1, wherein the instructions cause the processor to determine an available core that will be allocated a corresponding compilation process, based on a performance of the available core, and attribute information of an application program corresponding to the provided compilation process.

5. The electronic device of claim 4, wherein the attribute information of the application program comprises a size of the application program.

6. The electronic device of claim 1, wherein the instructions cause the processor to:
   detect whether the first compilation of the first application program and the second compilation of the second application program are completed within the specified time; and
   determine the at least one application program that has not been completed to be compiled within the specified time, as the application program that has failed to be compiled.

7. The electronic device of claim 1, wherein the instructions cause the processor to:
   detect at least one of a compilation process provision error or a compilation process operation error; and
   determine an application program corresponding to an erroneous compilation process, as the at least one application program that has failed to be compiled.

8. An operation method of an electronic device, the method comprising:
- generating a request signal to compile a plurality of application programs;
- based on the request signal, performing a first compilation on a first application program among a plurality of application programs by using a first core among a plurality of cores comprised in the electronic device and a second compilation on a second application program among the plurality of application programs by using a second core among the plurality of cores during a booting operation, the first compilation and the second compilation being performed in parallel;
- determining whether a signal indicating that a respective compilation for an application program is complete is detected within a specified time from when the request signal is generated;
- determining an application program for which the signal has not been detected within the specified time among the plurality of application programs as at least one application program that has failed to be compiled in parallel;
- in response to detecting the at least one application program that has failed to be compiled in parallel, performing a rebooting operation;
- performing a series compilation on the at least one application program that has failed to be compiled in parallel, by using one core among the plurality of cores during the rebooting operation;
- providing system attribute information based on a system information file during the booting operation;
- providing two or more compilation processes based on the system attribute information;
- performing parallel compilation of the first application program and the second application program by using the two or more compilation processes;
- determining a number of available cores during the booting operation; and
- providing the two or more compilation processes based on the number of available cores.

9. The method of claim 8, wherein
the system attribute information comprises at least one system information comprised of a key and a value.

10. The method of claim 9, wherein providing the two or more compilation processes comprises:
- providing the two or more compilation processes based on the determined number of compilation processes.

11. The method of claim 10, further comprising determining an available core that will be allocated a respective one of the two or more compilation processes, based on a performance of the available core, and attribute information of an application program corresponding to the respective one of the two or more compilation processes,
- wherein the attribute information of the application program comprises a size of the application program.

12. The method of claim 8, further comprising:
- detecting whether the first compilation of the first application program and the second compilation of the second application program are completed within the specified time; and
- determining the at least one application program that has not been completed to be compiled within the specified time, as the at least one application program that has failed to be compiled.

13. The method of claim 8, further comprising:
- detecting at least one of a compilation process provision error or a compilation process operation error; and
- determining an application program corresponding to an erroneous compilation process, as the at least one application program that has failed to be compiled.

14. An electronic device comprising:
- a display;
- a processor electrically connected to the display and comprising a plurality of cores; and
- a memory electrically connected to the processor,
- wherein the memory is configured to store a plurality of application programs, and stores instructions which, at execution, cause the processor to:
  - generate a request signal to compile the plurality of application programs;
  - provide system attribute information based on a system information file, during a booting operation;
  - provide a plurality of compilation processes based on the provided system attribute information;
  - based on the request signal, perform a first compilation on a first application program among the plurality of application programs by using a first core among the plurality of cores and a second compilation on a second application program among the plurality of application programs by using a second core among the plurality of cores, the first compilation and the second compilation being performed in parallel;
  - determine whether a signal indicating that a respective compilation for an application program is complete is detected within a specified time from when the request signal is generated;
  - determine an application program for which the signal has not been detected the signal within the specified time among the plurality of application programs as at least one application program that has failed to be compiled in parallel;
  - provide system attribute information based on a system information file during the booting operation;
  - provide two or more compilation processes based on the system attribute information;
  - perform parallel compilation of the first application program and the second application program by using the two or more compilation processes;
  - determine a number of available cores during the booting operation; and
  - provide the two or more compilation processes based on the number of available cores.

* * * * *

UNITED STATES PATENT AND TRADEMARK OFFICE
CERTIFICATE OF CORRECTION

| | | |
|---|---|---|
| PATENT NO. | : 11,435,985 B2 | Page 1 of 1 |
| APPLICATION NO. | : 16/975056 | |
| DATED | : September 6, 2022 | |
| INVENTOR(S) | : Lee et al. | |

It is certified that error appears in the above-identified patent and that said Letters Patent is hereby corrected as shown below:

On the Title Page

Column 1, Item (72), Lines 3 & 4, "Chui Kang" should read -- Chul Kang --.

Signed and Sealed this
Third Day of January, 2023

*Katherine Kelly Vidal*

Katherine Kelly Vidal
*Director of the United States Patent and Trademark Office*